May 11, 1948. A. R. FRIEGEL 2,441,316
INTERLOCK
Filed Sept. 19, 1944 6 Sheets-Sheet 1
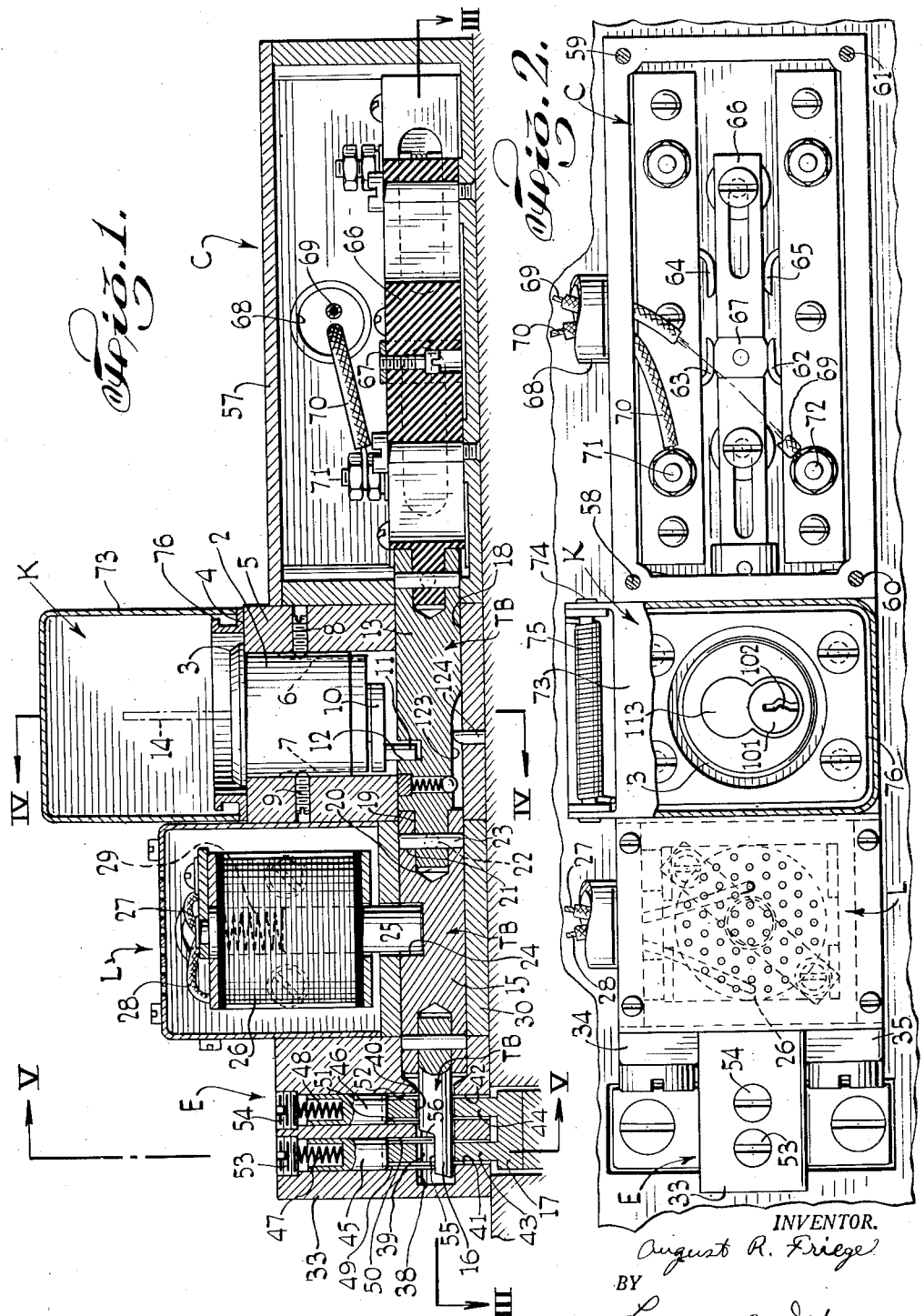
INVENTOR.
August R. Friegel
BY
Lyman E. Dodge
ATTORNEY

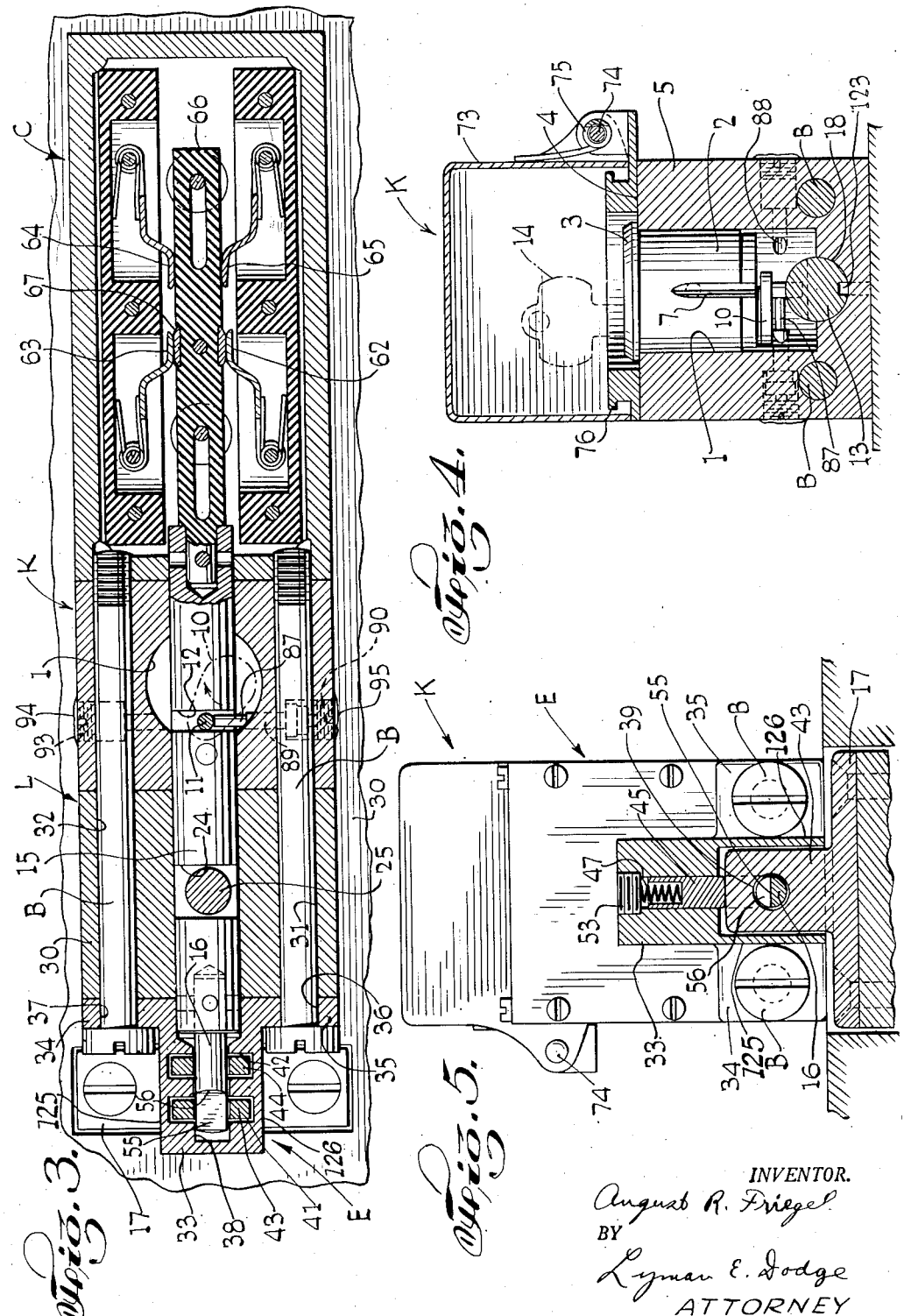

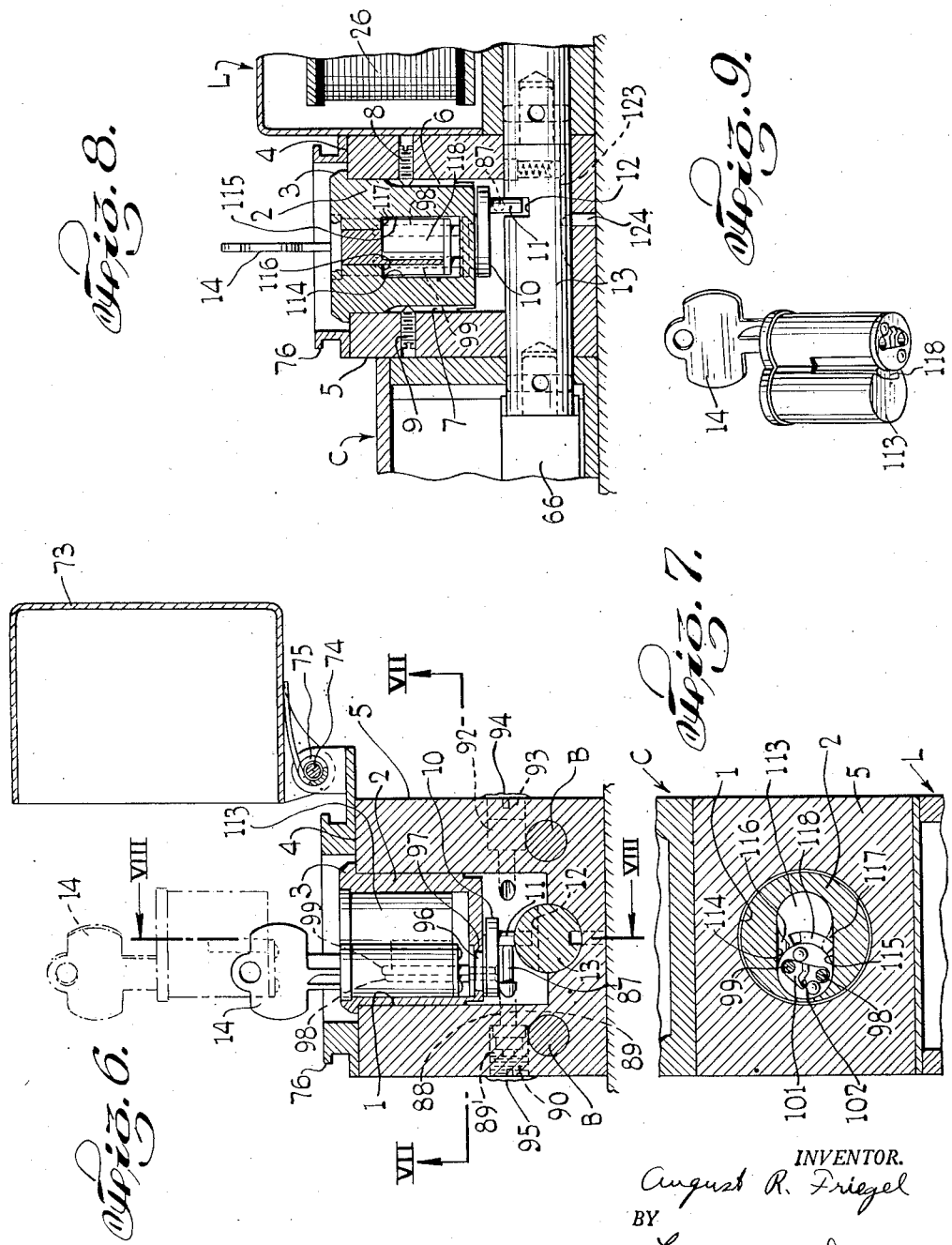

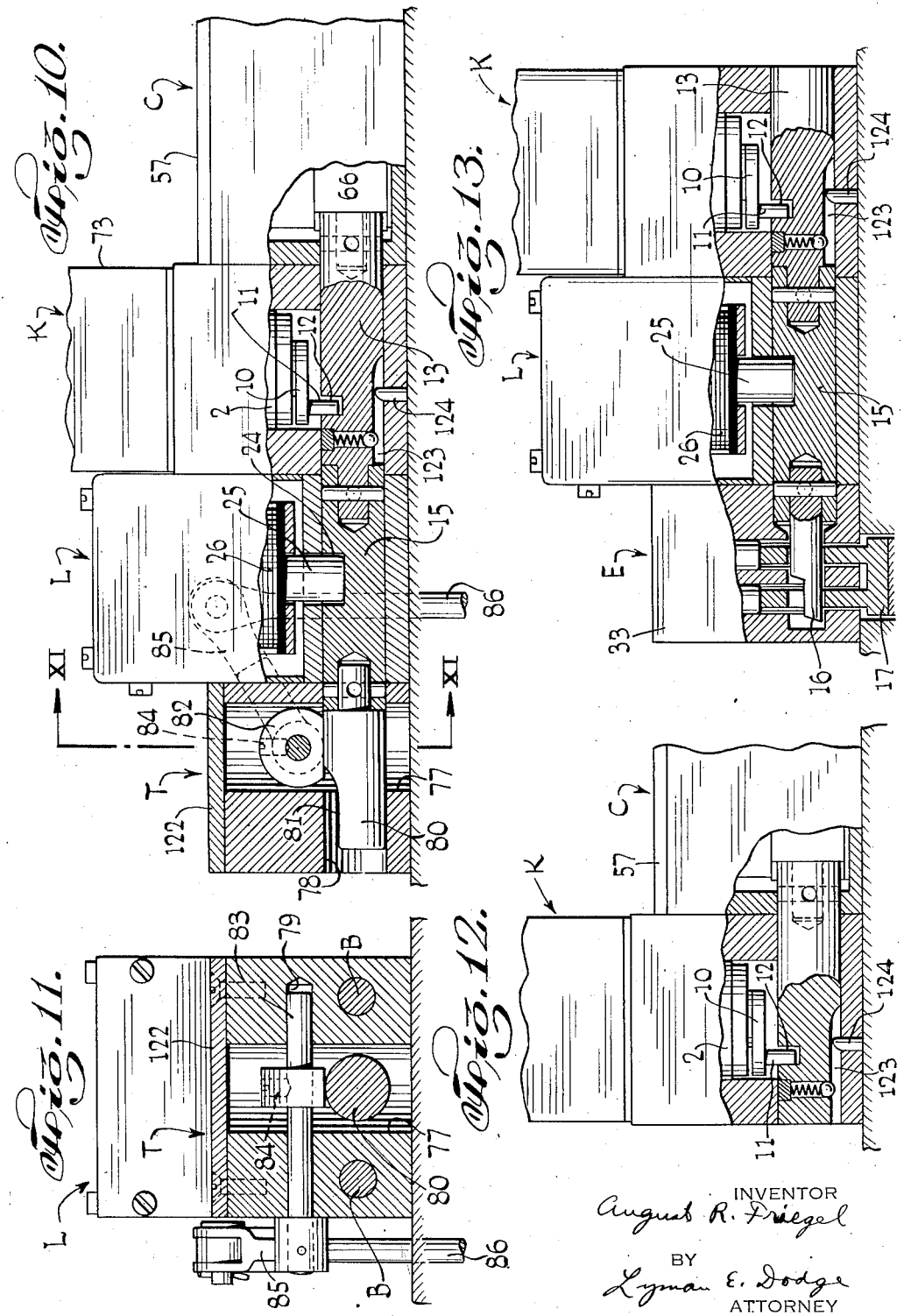

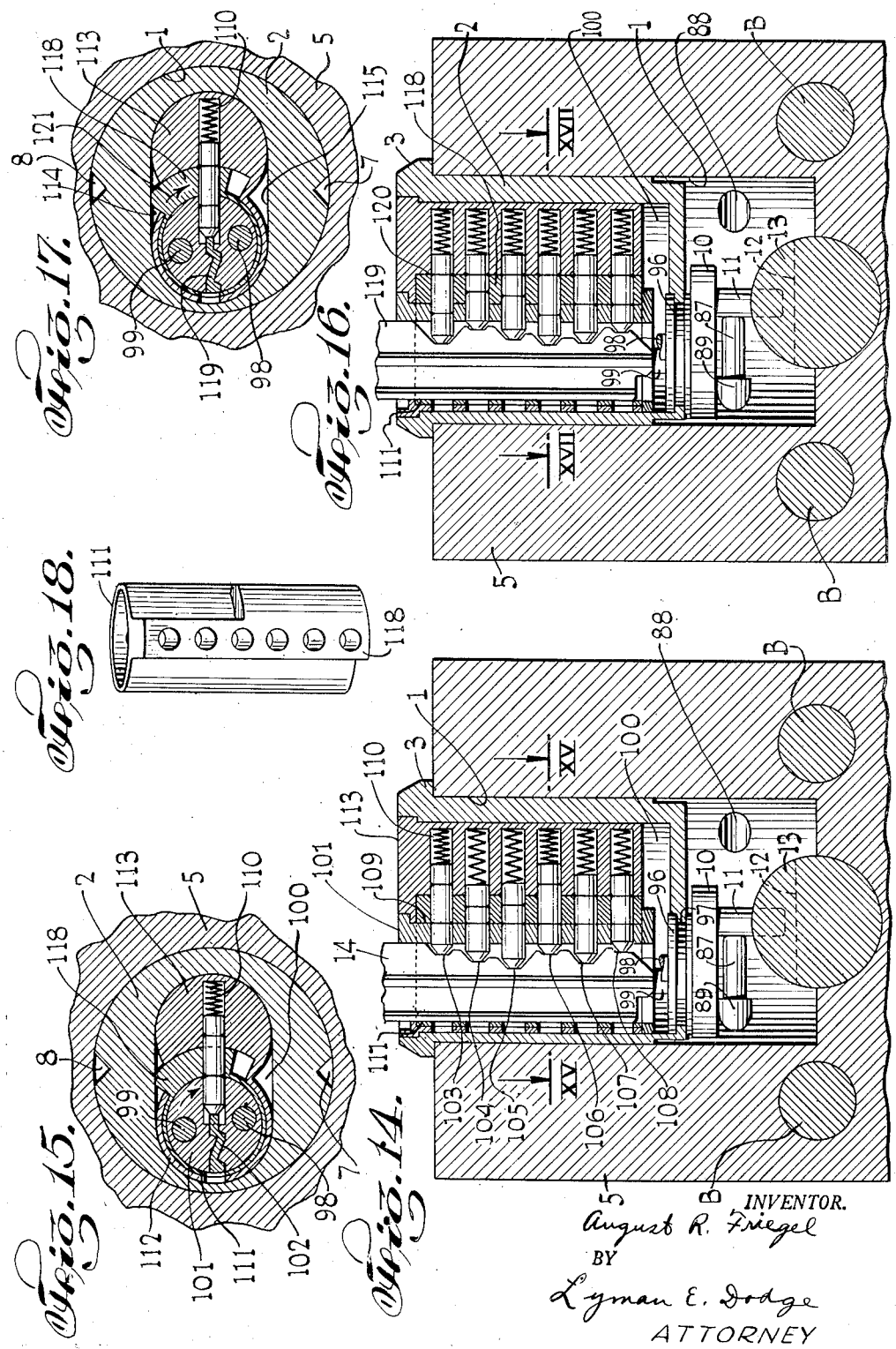

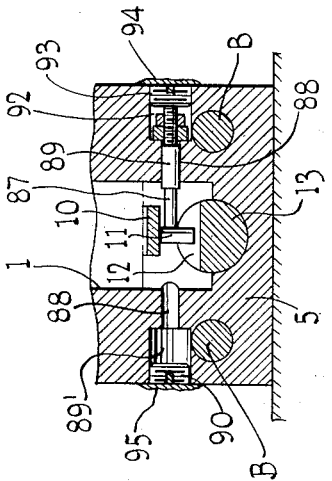
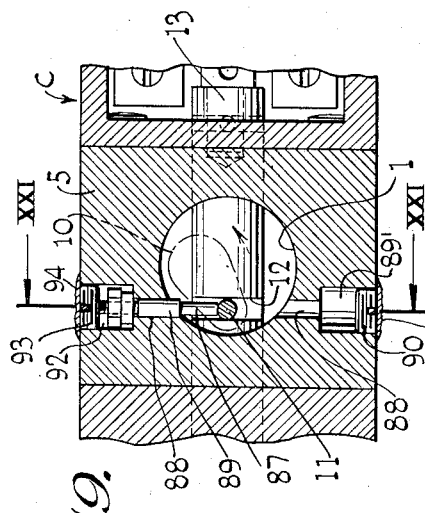
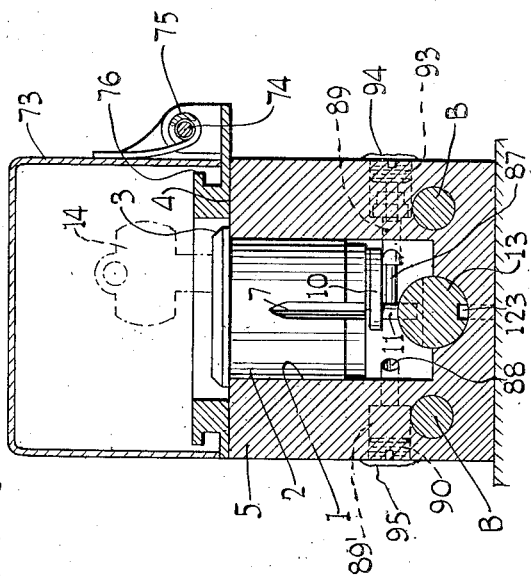

Patented May 11, 1948

2,441,316

UNITED STATES PATENT OFFICE 2,441,316

INTERLOCK

August R. Friegel, New York, N. Y.; Elsie M. Friegel, administratrix of said August R. Friegel, deceased, assignor to The Superior Appliance Company, New York, N. Y., a copartnership Application September 19, 1944, Serial No. 554,755

9 Claims. (Cl. 200—50)

This invention relates to a device to insure the correct sequential operation of related mechanisms, commonly called a key interlock.

A principal object of this invention is to provide devices of the character described which are so constructed and arranged that they are universal, that is, may be assembled, without structural alteration, so as to conform to any desired situation.

Other objects and advantages will be pointed out as the description progresses and the novel features will be particularly pointed out in the appended claims.

In describing the invention in detail, reference will be had to the accompanying drawings and the several views thereon, in which like characters of reference refer to like parts throughout the several views and in which:

Fig. 1 is a longitudinal, vertical, sectional view of a combination of devices embodying my invention; Fig. 2 is a top plan view of the device as shown by Fig. 1; Fig. 3 is a horizontal, sectional view of the device as shown by Fig. 1 on the plane indicated by the line III—III viewed in the direction of the arrows at the ends of the line; Fig. 4 is a vertical, sectional view of the device as shown by Fig. 1 on the plane indicated by the line IV—IV viewed in the direction of the arrows at the ends of the line; Fig. 5 is a vertical, sectional view of the device as shown by Fig. 1 on the plane indicated by the line V—V viewed in the direction of the arrows at the ends of the line; Fig. 6 is a view similar to Fig. 4 but illustrates the removing of a pair of joined barrels; Fig. 7 is a horizontal, sectional view of the device as shown by Fig. 6 on the plane indicated by the line VII—VII viewed in the direction of the arrows at the ends of the line; Fig. 8 is a fragmentary, vertical, cross sectional view on the same plane as that of Fig. 1 but viewed from the other side; Fig. 9 is a perspective view illustrating the joined lock barrels used with my invention; Fig. 10 is a view similar to Fig. 1 but illustrating a different combination of auxiliary device; Fig. 11 is a vertical, cross sectional view of the device as shown by Fig. 10 on the plane indicated by the line XI—XI viewed in the direction of the arrows at the ends of the line; Fig. 12 is a side elevational view with some parts broken away to more clearly show the internal construction of a more simple combination than that shown in Fig. 1; Fig. 13 is a side elevational view, with parts broken away to more clearly show the internal construction of another combination, but different from that of Fig. 1; Fig. 14 is a cross sectional view similar to Fig. 6, but sectioned in greater detail to show the operation of a key; Fig. 15 is a cross sectional view of the device as shown by Fig. 14 on the plane indicated by the line XV—XV viewed in the direction of the arrows at the ends of the line; Fig. 16 is a view similar to Fig. 14 but illustrating the operation of a different form of key; Fig. 17 is a cross sectional view of the device as shown by Fig. 16 on the plane indicated by the line XVII—XVII viewed in the direction of the arrows at the ends of the line; Fig. 18 is a perspective view of a detaching cylinder used with my invention; Fig. 19 is a fragmentary, cross sectional view on the same plane as Fig. 3 but illustrating the position of the parts for what I call left-handed operation; Fig. 20 is a view similar to Fig. 4 but illustrating the parts for left-hand operation; Fig. 21 is a fragmentary, cross sectional view of the device as shown by Fig. 19 on the plane indicated by the line XXI—XXI viewed in the direction of the arrows at the ends of the line.

In certain situations, it is important that one device be in a definite condition before another device is accessible or manipulatable. For instance, it is often quite important that an oil circuit breaker be opened before a main switch in the same electric power circuit is accessible or operable. To provide for this want, devices, called key interlocks, have been devised. These key interlocks are devices which may, in general be described as devices associated with dependent devices, and so combined that it is necessary to place a first device in a particular condition before it is possible to withdraw a key usable to gain access to a second device and when access is thus gained to the second device, the key may not be obtained to operate the first device until the second device has been restored to a predetermined condition.

Heretofore, key interlocks, and their associated auxiliaries, such as electro-magnetic locks, circuit controllers, eye receivers, timers and bolts have been constructed largely as special devices suited, generally, for one situation only.

My invention is directed to the key-receiving structure and the associated auxiliaries, such as electromagnetic locks, circuit controller, eye receivers, timers and bolts with the purpose to provide such devices in such form that they are adapted to be used singly or combined to provide required interlocking for any situation.

In Fig. 1, I have illustrated a combination, made possible by my invention, of four devices each of utility in some problem of mechanical interlocking and in some cases desirably associated together.

In Fig. 1, the principal device is the key receiver, designated, as a whole by K. An electromagnetic lock is designated L. A circuit controller is designated C. Each of these devices is a separate article of manufacture and K may be used alone or combined with one, any, or all of the others. To combine one, any, or all of the devices with K, it is merely necessary to provide assembly bolts as B, Fig. 3, of the proper length and to suitably adjust the length of throw bolts T B.

The key receiver K is formed as substantially a rectangular prism provided with various through bores, cavities, and orifices. A main cavity is 1, well shown in Fig. 4. In this cavity, a cylindrical lock cylinder 2 is positioned. This lock cylinder has a flange 3 resting on the top face 4 of the body 5, regulating the penetration of the cylinder. The cylinder also has shallow grooves 6 and 7 well shown in Fig. 8, at substantially opposite diametral points into which may be protruded holding set screws 8 and 9 by which the cylinder may be maintained tightly in position and properly positioned rotatively as respects its longitudinal axis. Depending from the cylinder is a crank arm 10, supported and operated in a manner which will be hereinafter fully described, bears the depending crank pin 11, positioned to engage in a cross slot 12 in a throw bolt 13. The crank arm is pivoted eccentrically to the center of cylinder 2 so that when it is oscillated, by means to be hereinafter described, the bolt 13 is reciprocated longitudinally. At this point, it may be stated that the key 14 is the means by which the crank arm 10 is oscillated. When the key is in the position as shown by Fig. 1 the key may be withdrawn, but the throw bolts 13, 15 and 16 will be in the position as shown by Fig. 1, that is, all to the extreme left as viewed in Fig. 1. In this position, throw bolt 16, prevents the removal of the eye piece 17. Eye piece 17 may be considered, as in usual practice, as is well understood by those skilled in the art, to be any device which must be movable when key 14 is removed from cylinder 2, that is, a device such as a main switch which has been closed and locked closed before key 14 may be removed to unlock an oil switch, in the same circuit, which has previously been opened, releasing key 14, and cannot again be closed without the use of key 14 and when closed prevents the removal of key 14 therefrom. Such general objects have heretofore been accomplished by the prior art and may be said to be indicated generally by the patent to Kirk No. 2,065,859, granted December 29, 1936.

Throw bolt 13, shown in end view in Fig. 4, lies in a through bore 18 in body 5. This bore intersects cavity 1. The throw bolt 13 is preferably cylindrical and is formed at each end with means for connecting to throw bolts at each end thereof when K is used in combination with auxiliary devices on each side thereof. If used without such auxiliary devices the ends of bolt 13 may be plain or as desired. Throw bolt 13 is also formed with a groove 123, into which protrudes a pin 124, thus preventing the bolt from turning.

At the left hand end of bolt 13 as viewed in Fig. 1, a cylindrical tongue of reduced diameter 19 is formed. This tongue protrudes into a cylindrical cavity 20 in the end of throw bolt 15. This cavity 20 and tongue 19 are made a rather loose fit so that problems of accurate alignment will not arise. Through bores, 21 and 22, at a right angle to one another, are formed through the end of bolt 15 and also tongue 19 and through one of these bores a pin 23 is passed securing 13 to 15. If it were advisable or necessary to rotate bolt 15 on its axis through ninety degrees then the bore 21 in 15 would be used to receive pin 23. This construction provides freedom from excessive care in securing alignment of the throw bolts and also allows the various throw bolts and the auxiliaries to which they appertain to be rotated relatively through an angle of ninety degrees or multiples thereof.

As it is frequently necessary or desirable to control the throw of bolt 13 and so bolts 15 and 16 from a remote point in accordance with the conditions at a remote point, I provide bolt 15 with means for locking it electro-magnetically. This means, preferably, includes a notch 24 formed in bolt 15 and a locking plunger 25 adapted to rest in the notch. Just so long as the locking plunger is in the notch, the bolt may not be moved by manipulating key 14. Under the proper condition the coil 26 is energized in a usual or ordinary manner by applying a difference of potential to wires 27 and 28, whereupon, lock plunger 25, formed of magnetic material, is drawn upwardly out of notch 25 and thereafter throw bolt 15 may be moved longitudinally. In short, the operation of bolts 13 and 15 and so key 14 is controlled or governed electro-magnetically, in this case by the closing of a circuit, thus raising plunger 25 against gravity and the action of a spring, as 29, if desired.

Electro-magnetic lock L includes a base 30 formed with through bores, as 31 and 32, well shown in Fig. 3, through which the combining bolts B may pass to bind the electro-magnetic lock to the body 5 of the key receiver K.

In the combination shown, an eye receiver E is attached to the left hand end of lock L, as shown in Fig. 1. The eye receiver is substantially a rectangular prism 33 formed with side flanges 34 and 35, well shown in Fig. 2. Through bores 36 and 37 extend through the flanges for the reception of the binding bolts B. The body is also formed with a cavity 38 simulating a bore for the reception of a throw and locking bolt 16. This bolt 16 is positioned to pass through the eye piece 17, attached to any suitable or desired body, which is provided with through bores 39 and 40 for the purpose of receiving bolt 16. When the locking bolt 16 is in the position as shown in Fig. 1 the eye piece 17 cannot be withdrawn from the eye piece receiver.

The locking bolt 16 may be attached to throw bolt or electro-magnetic bolt 15 by a connection identical with that between 13 and 15, but it is preferred to modify it by entering the full diameter of cylindrical bolt 16 into the cavity in 15.

Body 33 of the eye piece receiver is formed with two slots 41 and 42 to separately receive the tongues 43 and 44 of the eye piece. In each of these slots there is a plunger or tumbler, as 45 and 46, spring pressed by springs as 47 and 48. These plungers 45 and 46 are cylindrical but their diameter is slightly greater than the width of the slots 41 and 42 so that when bolt 16 is withdrawn and eye piece 17 is removed, the plungers extend so that their lower ends are on a line with the bottom of the cavity 38, small grooves, as 49, 50, 51 and 52 being formed in the body so that they may so function. They may be inserted and removed by removing blind screws 53 and 54, which also serve as abutments for springs 47 and 48.

It will be observed that locking bolt 16 is reduced on its outer end to about one-half of its diameter leaving a flat face 55. This is part of the construction to prevent unauthorized and unwarranted operation of the device. If eye piece 17 is removed after bolt 16 is withdrawn, then plungers 45 and 46 descend to cover cavity 38 to prevent entrance of bolt 16, and bolt 16 may be returned to the position as shown in Fig. 1 only after eye piece 17 has first been returned forcing back plungers 45 and 46. However, somebody might attempt to evade the proper operations of the device and insert an instrument or tool in slot 42 forcing plunger 46 inwardly. Then bolt 16 could be moved to the left even if eye piece 17 were not in place. But bolt 16 would be stopped by plunger 45. If this were then forced back by some instrument, it would no longer prevent the complete throwing of bolt 16, but by forming a flat 55 and a resulting stop shoulder 56 on the bolt, the plunger 46 would abut the shoulder 56 and prevent complete throw of the bolt. To successfully evade the proper functioning of the device a special tool or tools would have to be provided which would hold both plungers back at the same time and also allow a throw of the bolt. In order to successfully evade proper functioning it would probably be necessary to construct a device simulating the eye piece 17, but then when the bolt is completely thrown, the device would be locked in place and would give evidence that the proper functioning of the device had been evaded. In order to further prevent maliciously inclined persons from improper operation of the device, end walls 125 and 126 have been supplied. These cover and protect plungers 45 and 46.

Eye receiver E may be combined as shown in Fig. 1 or it may be rotated 180° about the bolt 16 from the position shown, so that it serves for an eye piece to be locked approaching either from the top or the bottom as viewed in Fig. 1.

As is well known, it is desirable, at times, to make or break an electrical circuit by the operation of the key receiver. For this purpose, I have devised a circuit controller C which may be used alone or in combination with the other auxiliaries to cooperate with the key receiver.

The circuit controller C is in the general form of a rectangular hollow box formed by walls, of which one, the top 57 is, preferably, easily removable being attached by screws 58, 59, 60 and 61. It is attached to key receiver K by bolts B as best shown in Fig. 3. The box contains electrical contacts as needed. I have shown two pairs of stationary contacts 62, 63, 64 and 65, each properly mounted and insulated. I have also shown a movable circuit controlling bar 66, which may support needed cross connection bars as 67. The wire outlet is shown at 68 and two wires at 69 and 70. One wire is connected to post 71 and the other to post 72, thus utilizing stationary contacts 62 and 63. The movable circuit controlling bar 66 is connected to throw bolt 13 by a connection identical with the connection between 13 and 15, so that when throw bolt 13 is oscillated, bar 66 is oscillated, and connection between 62 and 63 is made and broken. The circuit thereby controlled may be used in any of the well known ways.

As the whole combination may, at times, be exposed to the weather, I have provided a storm cover 73, hinged at 74 and spring pressed to closed position by spring 75. The cover, when closed, is slightly spaced from a water baffle 76 which prevents water from entering the space in which the top of the cylinder 2 is positioned and in which the key slot is situated.

In Fig. 10, I have shown a combination of the key receiver K, the circuit controller C, the electro-magnetic lock L and a timer T.

The timer T is substantially a rectangular prism formed with a through bore 77, although closed at the top by a cover 122, a through bore 78, at a right angle thereto. The bore 78 receives the locking bolt 80. This locking bolt is connected to throw bolt 15 in the same manner that 15 is conected to 13. The bolt 80 is cylindrical in form but is formed with a cut away disc receiving portion 81. The disc 82 which cooperates with cut away portion 81 is mounted to oscillate. When the bolt is in the position as shown in Fig. 10, a flattened portion on the disc rests upon the top of bolt 80 preventing oscillation thereof, but when the bolt is thrown to the right as viewed in Fig. 10, then the cut away portion 81 comes under the disc 82 and it may be oscillated so that it rests in the cut away portion 81, thus restraining a return of bolt 80 to the position as shown in Fig. 10.

In order to provide for the oscillation of disc 82, it is mounted on a disc shaft 83, which in turn is mounted in bearing cavity 79. The disc is held in position on shaft 83 by set screw 84.

Shaft 83 extends outwardly of the body at the timer and has a crank arm 85 mounted thereon. A suitable or desired mechanism, as is well understood, may be connected to the free end of crank 85, as by a link 86. The mechanism so connected by link 86 will be locked from movement when bolt 80 is in the position as shown in Fig. 10 and bolt 80 will be locked against return movement after disc 82 has been turned into cut away portion 81. That is, a device connected to crank arm 85 must be in a certain definite position so that 82 will be in a certain definite position in order, in one case for 80 to be moved and in the other case for 85 to be moved. This device connected to crank arm 85 may well include an elapsed time element and so the whole device is called a timer.

The key receiver K is the fundamental controlling device and this operates by insertion of key 14. When key 14 is oscillated, crank arm 10 is oscillated and so crank pin 11. In order to prevent the crank pin 11 from being oscillated too much, a crank pin stop 87 is provided, see Figs. 19, 20 and 21. This, in the preferred form, is in the form of a cylindrical pin positioned in a bore 88 of key receiver body 5. The outer end of the pin is threaded and two nuts placed thereon which by adjustment will determine the extent to which pin 87 will extend into cavity 1. The bore 88 is enlarged at 89' to provide a shoulder for one of the nuts to bear against. The enlarged bore 89' is closed by the blind screw 90. As at times, the device is changed from what may be called right hand oscillation as described, to left hand oscillation, a bore is formed in the opposite side of the body 1 for the reception of pin 87. This bore also has an enlargement 92 and is closed by a blind screw 93. Both blind screws in practice are covered with sealing wax 94 and 95 to exhibit tampering therewith.

The crank arm 10 is attached to a shouldered disc 96, Figs. 14 and 16, which is journalled in shouldered orifice 97 of the bottom of the body cylinder 2. Through the crank 10 and the shouldered disc 96 extend two shouldered pins 98 and 99 which are headed or riveted below crank arm 10 and extend upwardly into a cavity 100 of cylinder 2. These pins are the direct means for oscillating crank 10. The two pins 98 and 99 extend into the body of an unlocking cylinder 101, as shown in Figs. 6 and 15. This unlocking cylinder 101 is formed with a key slot 102. When the proper key is inserted in the slot, the tumblers 103 to 108 inclusive, as shown in Fig. 14, are adjusted so that their ends aline with line 109, so that by turning key 14, unlocking cylinder 101 may be oscillated and so crank arm 10 oscillated and the throw bolts, as 13, operated. When the cylinder 101 has been oscillated, the lineup of the tumblers, as shown in Fig. 15, is changed, that is, the key 14 cannot then be removed because it is held by the tumblers, as 103, because the tumblers cannot then move back into cavities, as 110.

Locking cylinder 101 is positioned within detaching cylinder 111 and this cylinder is positioned in a barrel 112 permanently joined to tumbler and spring barrel 113. Both barrels 112 and 113 fit snugly within a like shaped cavity 100 of cylinder 2, except that the lower portion of the cavity has the portions underlying 114 and 115 cut away thus making the portions provide a shoulder on each side within the cavity, as shown in Fig. 7 at 116 and 117. Shoulder 117 is provided to engage with the end of segment 118 forming part of barrel 111.

In order to place the connected barrels 112 and 113 into cavity 100 of cylinder 2, a removing and replacing key 119 is placed in the key slot 102. This key lines up the tumblers 103 to 108 inclusive as shown in Fig. 16 so that a parting may be made along the line 120 as shown in Fig. 16. Due to this, detaching cylinder 111 may be oscillated, bringing segment 118 into position by oscillation in the direction of arrows 121 so that it does not protrude beyond the contour of barrels 112 and 113. Under such conditions, the barrels may be inserted downwardly into cavity 100 of cylinder 2 and when flange 3 seats, the key 119 upon being turned back will again cause segment 118 to protrude and catch under shoulder 117. To remove the barrels the same sequence of operations are gone through in reverse order. The appearance of the removed barrels is best shown in Fig. 9.

From the above description it will be understood that a key operated device is provided which may be operated to throw a bolt with one particular formed key, and may be inserted or removed from a containing cavity with another and that when in the cavity it is held therein by means which prevents its removal except by a proper key.

From the above given description it will be seen that I have provided a key interlock which includes a key receiver including an operating crank pin which may be operated as a right hand device or as a left hand device, and have provided a stop to limit the motion thereof which may be positioned to limit the motion of either a right hand moving crank pin or a left hand moving crank pin.

It is further evident that the cylindrical lock per se of my key receiver may be arranged in such a way that the tumblers will be of such length and so disposed that they will cooperate with a key of indefinite edge contour. It is also evident that I can arrange the tumblers so that one form of key will operate the crank pin and another form of key will be usable to withdraw the joined barrels from the cavity of the cylinder in which they are positioned and that I may place in that cavity any similar joined barrels with any particular tumbler combination that I see fit, or, if desired, I may withdraw the containing cylinder entirely and substitute a new containing cylinder with the desired joined barrels and tumblers therein.

From the above description it is further seen that with the key receiver I may combine a circuit controller alone or an electro-magnetic lock alone, or an eye receiver alone or any combination of such auxiliary devices with the key receiver, or the key receiver may be used alone to throw a bolt into an eye.

It is also seen that the combinations may be made by placing the circuit controller on the right hand side of the key receiver or on the left hand side of the key receiver and that the electro-magnetic lock and likewise the eye receiver may be placed either to the right or to the left of the key receiver. The timer may also be used with the key receiver alone or in conjunction with the electro-magnetic lock or in conjunction with the electro-magnetic lock and the circuit controller and if necessary the eye receiver may be positioned by the side of the timer.

In short, a key receiver and a number of auxiliary devices have been devised which are so usable and so combinable that by the proper combination thereof any condition generally made with any key-locking may be successfully solved by the use of devices which are standard and which do not have to be especially made for the particular conditions.

Although I have particularly described one particular physical embodiment of my invention and modifications thereof, nevertheless, I desire to have it understood that the form selected is merely illustrative and does not exhaust the possible physical embodiments of the idea of means underlying my invention.

What I claim as new and desire to secure by Letters Patent is:

1. In a key interlock, in combination: a key receiver formed with through bores for the reception of binding bolts; an electro-magnetic lock formed with through bores for the reception of binding bolts; an eye receiver formed with through bores for the reception of binding bolts; a current controller formed with cavities for the reception of the ends of binding bolts; binding bolts in the bores with their ends in the cavities whereby the key receiver, the electro-magnetic lock, the eye receiver and the circuit controller may be combined in line; means included in the key receiver for receiving a key; throw bolts included in the key receiver, the electro-magnetic lock and the eye receiver and a circuit controlling bar in the circuit controller all connected; means controlled by the electro-magnetic lock for preventing and allowing reciprocation of the throw bolts; means operated by the key adapted to reciprocate the throw bolts whereby an eye in the eye receiver may be locked or unlocked.

2. In a key interlock, in combination: a key receiver, an electro-magnetic lock, an eye receiver, and a circuit controller formed with abuttable surfaces and through bores for the reception of clamping bolts whereby the key receiver may be combined with one, any, or all of the other devices.

3. In a key interlock, in combination: a key receiver, and an electro-magnetic lock formed with similar abuttable surfaces on each side with through bores whereby they may be bound together with binding bolts and the electro-magnetic lock may be positioned abutting one surface or the opposite surface of the key receiver and binding bolts binding the receiver and lock together.

4. In a key interlock, in combination: a key receiver formed with through bores and opposite identical surfaces whereby auxiliary devices may be bound thereto to abut either of the identical surfaces and bolts in the through bores for binding the key receiver and the auxiliaries.

5. In a key interlock, in combination: a key receiver including a throw bolt; auxiliaries attached to each side of the key receiver and including throw bolts having their ends adjacent and means for connecting the throw bolts allowing misalignment thereof.

6. In a key interlock, in combination: a key receiver including a throw bolt; auxiliaries attached to each side of the key receiver and including throw bolts having their ends adjacent, the several throw bolts being formed at their adjacent ends one with a tongue and the connecting bolt with a cavity loosely receiving the tongue and a pin passing transversely through both adjacent ends.

7. In a key interlock, in combination: a key receiver including a throw bolt; auxiliaries attached to each side of the key receiver and including throw bolts having their ends adjacent, the several throw bolts being formed at their adjacent ends one with a tongue and the connecting bolt with a cavity loosely receiving the tongue and two through orifices in each tongue and cavity end and at a right angle one to the other whereby the bolts may be connected in two positions each relatively rotated 90° from the other; and a pin passing through the orifices of tongue and cavity and securing the adjacent ends together.

8. In a key interlock, in combination: a key receiver including a throw bolt and means to reciprocate the throw bolt; a timer including a throw bolt connected to the throw bolt of the key receiver, said timer also including a shaft at a right angle to the throw bolt mounted for oscillation; a disk on the shaft formed with a flattened portion adapted to rest on the throw bolt of the timer, said throw bolt of the timer formed with a cut away portion forming a shoulder whereby when the bolt is in one position the disk cannot be oscillated by the shaft and when the bolt is in another position the disc may be oscillated into the cut away portion thereby preventing movement of the timer throw bolt and the key receiver throw bolt and a crank arm connected to the shaft controlled as to possibility of movement by the throw bolt of the timer, said key receiver formed with opposite surfaces and through bores and the timer formed with through bores whereby the timer may be assembled with the key receiver on either side thereof and bolts for binding the key receiver and timer together.

9. In a key interlock, in combination: a key receiver including a throw bolt and means reciprocating the throw bolt, said key receiver formed with through bores and opposite faces; an eye receiver adapted to abut either of the opposite faces of the key receiver and be bound thereto; bolts for binding the eye receiver to the key receiver; a throw bolt in the eye receiver connected to the throw bolt of the key receiver and means including the form given to the eye receiver throw bolt to prevent the entrance of the eye receiver throw bolt into the eye receiver unless there is a proper eye piece resting in the eye receiver.

AUGUST R. FRIEGEL.

REFERENCES CITED

The following references are of record in the file of this patent:

UNITED STATES PATENTS

| Number | Name | Date |
|---|---|---|
| 1,561,771 | Best | Nov. 17, 1925 |
| 1,564,463 | Best | Dec. 8, 1925 |
| 1,656,854 | Best | Jan. 17, 1928 |
| 2,108,634 | Wilms | Feb. 15, 1938 |
| 2,166,061 | Kirk | Jan. 11, 1939 |